(12) United States Patent
Meyer et al.

(10) Patent No.: US 10,119,519 B2
(45) Date of Patent: Nov. 6, 2018

(54) METHOD AND DEVICE FOR MOUNTING A ROTOR OF A WIND ENERGY PLANT

(71) Applicant: Wobben Properties GmbH, Aurich (DE)

(72) Inventors: Wolfgang Meyer, Wiesmoor (DE); Gerrit Kuiper, Aurich (DE); Frank Knoop, Aurich (DE)

(73) Assignee: Wobben Properties GmbH, Aurich (DE)

( * ) Notice: Subject to any disclaimer, the term of this patent is extended or adjusted under 35 U.S.C. 154(b) by 626 days.

(21) Appl. No.: 14/349,577

(22) PCT Filed: Oct. 5, 2012

(86) PCT No.: PCT/EP2012/069785
§ 371 (c)(1),
(2) Date: Apr. 3, 2014

(87) PCT Pub. No.: WO2013/050569
PCT Pub. Date: Apr. 11, 2013

(65) Prior Publication Data
US 2014/0245580 A1    Sep. 4, 2014

(30) Foreign Application Priority Data
Oct. 7, 2011 (DE) .................. 10 2011 084 140

(51) Int. Cl.
*F03D 1/06* (2006.01)
*B66C 1/10* (2006.01)
*F03D 13/10* (2016.01)

(52) U.S. Cl.
CPC .............. *F03D 1/065* (2013.01); *B66C 1/108* (2013.01); *F03D 13/10* (2016.05);
(Continued)

(58) Field of Classification Search
CPC ......... F03D 1/065; F03D 1/001; B66C 1/108; F05B 2230/61
See application file for complete search history.

(56) References Cited

U.S. PATENT DOCUMENTS

| 5,626,017 A | 5/1997 | Sattelmayer |
|---|---|---|
| 7,000,396 B1 | 2/2006 | Storey |

(Continued)

FOREIGN PATENT DOCUMENTS

| CL | 201000043 A1 | 1/2010 |
|---|---|---|
| CN | 101324221 A | 12/2008 |

(Continued)

OTHER PUBLICATIONS

Shefter et al., *Assembling, Operating and Maintaining of Wind Power Installations*, M. Selkhozgiz, Moscow, USSR, 1960, pp. 50-56. (with English Translation) (13 pages).

*Primary Examiner* — Moshe Wilensky
(74) *Attorney, Agent, or Firm* — Seed Intellectual Property Law Group LLP

(57) ABSTRACT

The invention relates to a lifting beam for lifting and handling a rotor blade of a wind energy plant, comprising a fastening means for fastening the lifting beam to a crane, at least one fastening means for fastening the lifting beam to the rotor blade a longitudinal pivoting means for pivoting the rotor blade which is supported by the lifting beam about a longitudinal axis of the rotor blade, and/or a transverse pivoting means for pivoting the rotor blade which is supported by the lifting beam about a transverse axis perpendicular to the longitudinal axis. The invention further relates to a method for mounting rotor blades of a wind energy plant using a lifting beam according to the invention.

7 Claims, 4 Drawing Sheets

(52) U.S. Cl.
CPC ......... *F05B 2230/61* (2013.01); *Y02E 10/721* (2013.01); *Y02E 10/728* (2013.01); *Y02P 70/523* (2015.11); *Y10T 29/37* (2015.01); *Y10T 29/49332* (2015.01)

(56) References Cited

U.S. PATENT DOCUMENTS

| | | |
|---|---|---|
| 8,083,212 B2 | 12/2011 | Numajiri et al. |
| 8,142,155 B2 | 3/2012 | Numajiri et al. |
| 8,783,008 B2 | 7/2014 | Eroglu et al. |
| 8,991,185 B2 | 3/2015 | Huber et al. |
| 9,719,487 B2 | 8/2017 | Bech et al. |
| 2007/0258823 A1 | 11/2007 | Haarh et al. |
| 2008/0307647 A1 | 12/2008 | Kessler |
| 2010/0129229 A1 | 5/2010 | Grabau |
| 2011/0037279 A1* | 2/2011 | Alba ................ B66C 1/108 294/215 |
| 2014/0127025 A1 | 5/2014 | Hoffmann |

FOREIGN PATENT DOCUMENTS

| | | |
|---|---|---|
| DE | 201 09 835 U1 | 1/2002 |
| DE | 103 05 543 A1 | 8/2004 |
| DE | 10 2008 033 857 A1 | 1/2010 |
| DE | 20 2010 003 033 U1 | 5/2010 |
| DE | 10 2009 005 632 A1 | 7/2010 |
| EP | 0694740 A2 | 1/1996 |
| EP | 2 003 333 A1 | 12/2008 |
| EP | 2385303 A1 | 11/2011 |
| JP | 2009-2206 A | 1/2009 |
| RU | 2050464 C1 | 12/1995 |
| RU | 96104693 A | 6/1998 |
| TW | 200914727 A | 4/2009 |
| WO | 2011061059 A2 | 5/2011 |
| WO | 2012034566 A1 | 3/2012 |
| WO | 2012163918 A1 | 12/2012 |

\* cited by examiner

METHOD AND DEVICE FOR MOUNTING A ROTOR OF A WIND ENERGY PLANT

BACKGROUND

Technical Field

The present invention concerns a lifting beam for lifting and handling a rotor blade as well as a handling arrangement with a lifting beam and a rotor blade for handling a rotor blade. The invention also concerns a transport apparatus for transporting a lifting beam, a method of fitting rotor blades, a method of fitting a rotor, a method of removing rotor blades and a method of replacing rotor blades.

Description of the Related Art

Wind power installations have long been known and a common type is a so-called horizontal-axis wind power installation as is also shown in FIG. 1. A horizontal-axis wind power installation or a wind power installation with a horizontal-axis rotor denotes an arrangement with a horizontal rotor axis, to distinguish it from a type with a vertical rotor axis. An exactly horizontal orientation of the rotor axis is not an important consideration, but the aim is only to denote the basic type of installation. Nowadays conventional horizontal-axis wind power installations have three rotor blades, and the invention hereinafter is concentrated thereon without being restricted thereto. Insofar as details hereinafter make sense only in connection with a horizontal-axis rotor with three rotor blades, it is to be correspondingly assumed that this involves a rotor having three rotor blades.

To install a wind power installation it was usual for the rotor with the rotor blades to be prefabricated on the ground at the location of erection of the wind power installation, namely to fix the rotor blades to the rotor hub. The rotor prefabricated in that way was then lifted off the ground in particular at the rotor hub together with the rotor blades fitted thereto and fixed to a pod which was already mounted on a mast or pylon, without the rotor.

With an increasing size of wind power installations and thus an increasing rotor blade length such a kind of fitment procedure is found to be more and more difficult. Thus for example the rotor of an Enercon E126 wind power installation is of a diameter of 126 meters (m). Handling a rotor of that size is difficult and makes high demands in particular on the crane. Besides the geometrical dimensions, such a rotor is also of an enormous mass and thus enormous weight. Added to that is the fact that, in the case of such modern large wind power installations, the pylon is even higher and in particular the installed axis height is very high. Thus a wind power installation from Enercon of type E126 can involve an axis height of over 130 m, which corresponds to three times the height of the sailing school ship Gorch Fock.

In particular the height to which a component to be fitted has to be lifted and also the load thereof quite substantially determine the required crane and thus its costs. An additional height of a few meters can sometimes mean that a crane of a next higher category is required. In that respect the cranes used for erecting large modern wind power installations like the E126 already nowadays belong to the category of the largest available truck-mounted cranes.

If a rotor blade is installed individually on a rotor hub which has already been fitted to the pod then in corresponding fashion it is only the weight of that one rotor blade that needs to be lifted. Thus for example a rotor blade can be fitted vertically from below to a suitably oriented rotor hub. In the case of a three-blade rotor however the other two positions for the other two rotor blades are then at a high position. To install the two rotor blades therefore the respective rotor blade would have to be lifted to a corresponding height, namely higher than the axis of the rotor, or the rotor hub would have to be rotated.

That rotation of the rotor hub with a rotor blade installed thereon however requires a correspondingly great force to lift the rotor blade which has already been installed, in a rotary movement. In principle such a rotation can be implemented by means of the generator operating in a motor mode. For that purpose however a suitable installation of the generator would be required at that early stage in construction, including linking it to the power supply network into which the generator feed is later to occur in order to take energy for that motor mode. In addition the generators would have to be suitably supplied with energy for that specific task and appropriately controlled.

As general state of the art attention is directed to the documents EP 2 003 333 A1, DE 10 2008 033 857 A1, DE 20 2010 003 033 U1, DE 201 09 835 U1 and DE 103 05 543 C5.

BRIEF SUMMARY

One or more embodiments of the present invention is to address and in particular entirely or partially resolve one of the above-mentioned problems. In particular, one embodiment of the invention seeks to provide a solution for improved fitment of a rotor and possibly also an improved possible way of removing or replacing a rotor blade. Another embodiment at least seeks to afford an alternative solution.

According to the invention there is proposed a cross lifting beam as set forth in claim 1. Such a lifting beam is provided for lifting and handling a rotor blade. It has a crane fixing means with which the lifting beam can be fixed to a crane and in particular suspended therefrom. In addition there is provided at least one blade fixing means with which the lifting beam can be fixed to the rotor blade or vice-versa. The lifting beam also has a longitudinal pivoting means, by way of which the rotor blade carried by the lifting beam can be pivoted about a longitudinal axis of the rotor blade. In particular the lifting beam with that longitudinal pivoting means is so adapted that it for example holds a rotor blade horizontally and in that respect rotates or pivots it in that horizontal position about the horizontal rotor blade axis.

In addition or alternatively there is provided a transverse pivoting means to pivot the rotor blade carried by the lifting beam about a transverse axis which is transverse relative to the longitudinal axis. In that respect the important consideration is not a precisely 90° arrangement of the transverse axis relative to the longitudinal axis, but the fact that the rotor blade can be pivoted by means of the transverse pivoting means, in particular in such a way that the longitudinal axis is altered, in particular raised or lowered.

The longitudinal pivoting means and the transverse pivoting means are thus provided to implement two different pivotal movements of the rotor blade, which can involve different purposes, as is described hereinafter.

Preferably the longitudinal pivoting means is an actuator for actively pivoting the rotor blade. The longitudinal pivoting means can thus actively exert a force for example by a motor and/or hydraulic drive, and in particular can apply work to pivot the rotor blade about the longitudinal axis. In an embodiment the longitudinal pivoting means is formed at least by such an actuator and can have additional elements like in particular fixing elements.

Preferably the transverse pivoting means is adapted for passive pivoting and has a brake and additionally or alternatively a securing means or locking means for securing or locking the lifting beam in at least two mutually different pivotal positions. The transverse pivoting means does not in that respect have an actuator which can actively exert a force and in particular do work, but only passive means which can permit and guide a corresponding pivotal movement. Accordingly on the one hand there is implemented a corresponding pivot axis and rotating parts, while on the other hand a brake can brake or stop a pivotal movement which is produced in some other fashion. When a desired end position is reached a suitable locking means is proposed for locking purposes, such as a lock which is adapted for temporary bolt engagement. Accordingly therefore a pivotal movement is caused by external forces such as for example a force caused by weight, but in that case is guided by the transverse pivoting means, more specifically in particular in respect of its direction and speed of movement, including the possible option of stopping the pivotal movement. In a configuration the transverse pivoting means is formed at least by a pivot joint between two structures which provides a corresponding pivot axis and it can have additional elements such as in particular described elements for braking the pivotal movement or for locking a pivoted position.

In an embodiment the lifting beam is characterized by an upper and a lower carrier frame portion. The upper carrier frame portion is to be connected to the crane and the lower carrier frame portion is to be connected to the rotor blade. In that case the transverse pivoting means is adapted to perform a pivotal movement of the lower carrier frame portion relative to the upper carrier frame portion. There are thus two carrier frame portions which are pivotable relative to each other. Preferably there can be provided a securing disc which is adapted to fix different pivotal positions of the lower carrier frame portion relative to the upper carrier frame portion. For example for that purpose a brake like a shoe-type brake can engage the securing disc and thus provide for braking or fixing the pivotal position. Alternatively or additionally the securing disc can have bores into which a bolt or pin can be introduced for fixing a pivotal position.

In an embodiment the lifting beam is characterized in that three blade fixing means are provided and have a respective carrier loop for releasably fixing a rotor blade. In that respect each carrier loop is provided in particular to co-operate with a bolt, pin or similar counterpart portion on the rotor blade. Thus for each carrier loop there can be provided such a bolt or pin which is passed through the carrier loop to retain the carrier loop and thereby make a connection between the lifting beam and the rotor blade.

Preferably the longitudinal pivoting means has a linear actuator, in particular a hydraulic cylinder, for lifting and lowering one of the blade fixing means. In particular the linear actuator is disposed between the carrier loop of the corresponding one blade fixing means and the lower carrier frame portion. Thus three fixing means are provided on the lifting beam and thus in use there are three fixing points on the rotor blade. In that case the linear actuator co-operates with one of the three blade fixing means and can lift or lower a carrier loop and thus a fixing point. The fact that the other two fixing points—relative to the lower carrier frame portion of the lifting beam—remain unchanged in their position in that case means that a pivotal movement of the rotor blade can be achieved by that linear actuator. Suitable actuation means can be arranged on the lifting beam. For that purpose there can be provided energy storage means like electrical energy storage means, such as a battery, capacitor, and the like, when using an electric motor and/or a pressure storage means, such as a hydraulic device, spring, and the like, when using a hydraulic cylinder, and the actuating system can be actuated for example by remote radio control by the service personnel on the ground or in the crane.

It is preferably proposed that the crane fixing means has at least one suspension portion, in particular a ring, an eye or a shackle for suspending the lifting beam from the crane. That makes it possible to achieve simple fixing to the crane and the described pivotal movements can be implemented by the suitably adapted lifting beam without adaptation of the crane being absolutely necessary for that purpose.

In addition there is proposed a handling arrangement for handling a rotor blade of a wind power installation. Part of that handling arrangement is a lifting beam and the rotor blade temporarily fixed thereto as well as a release device for releasing the connection between the rotor blade and the lifting beam. The connection between lifting beam and rotor blade is effected by means of at least one bolt, pin or similar element. In particular the connection is made in such a way that the lifting beam has at least one loop or eye, in particular a plurality of loops or eyes, and the bolt passes through each loop or eye in order thereby to make the connection. In addition there is a release device for releasing the connection between the rotor blade and the lifting beam. That release device has a pull means with which the bolt or pin can be drawn out of the loop thereby to release the respective connection. The pull means can thus be of such a design that no people like service personnel or members of the erection team have to be directly in attendance at the connecting location but rather remote actuation such as for example from the rotor hub can be effected. For that purpose the pull means can be a pull line of suitable length or another remote release or remote actuated device is provided.

Preferably the rotor blade has an aerodynamic blade surface and an internal space arranged therebeneath, wherein the blade surface has at least one opening for passing therethrough a blade fixing means of the lifting beam such as a fixing loop that couples with a bolt or pin as discussed above. In that arrangement the internal space has a fixing portion for fixing the blade fixing portion. In particular that fixing portion can include the described bolt or pin and can provide an axial guide for that pin. The fixing portion is correspondingly arranged in the proximity in particular beneath the openings in the aerodynamic blade surface in such a way that the loops of the blade fixing means can extend through those openings directly to the respective fixing portion.

In addition there is proposed a transport apparatus for transporting a lifting beam according to the invention. The transport apparatus has a transport frame having receiving portions adapted to the lifting beam. In particular in that case there is provided at least one carrier frame receiving means for receiving the lower carrier frame portion and/or there is provided an actuator receiving means for receiving the actuator of the longitudinal pivoting means. In that way the lifting beam can be reliably transported to the location of use, in particular the location for erection of a wind power installation.

According to the invention there is also proposed a method of fitting rotor blades as set forth in claim 10. Accordingly a rotor hub already fitted to the pod of the wind power installation or of the wind power installation to be erected is oriented in a first fitting position. In that case the rotor hub is in particular so oriented that it has a fixing flange for fixing a first rotor blade in a position in crosswise relationship, in which the first rotor blade can be fixed thereto in a horizontal orientation. In other words that fixing portion is oriented for fixing the first rotor blade in a so-called 3 o'clock or 9 o'clock position.

The first rotor blade is then lifted by means of a crane and a lifting beam and arranged for fixing to the rotor blade at the fixing portion which is oriented in the 3 o'clock or 9 o'clock position, and then fixed there. In that case the rotor blade is oriented horizontally and thus corresponds to that first fitting position of the rotor hub.

When that first rotor blade is fixed to the rotor hub, namely in particular is mounted thereto, then that first rotor blade is lowered by means of the lifting beam fixed to the crane so that the rotor hub rotates into a second fitting position. That second fitting position is adapted to fit a second rotor blade also in a horizontal orientation of a rotor hub. Correspondingly, the first rotor blade is lowered in such a way that, when the rotor hub is intended for a total of three rotor blades, the rotor hub rotates through 60°. The rotor hub is then locked in that new position, in particular by bolting engagement. Therefore at least one and generally a plurality of bolts are so arranged in the transitional region between rotor hub and pod, that the rotor hub cannot rotate any further. A suitable device can be provided for that purpose, which can also lock the rotor hub for other purposes such as for example maintenance purposes.

The lowering movement of the first fitted rotor blade is preferably effected by the lifting beam being capable of performing a corresponding pivotal movement transversely relative to the longitudinal axis of the rotor blade. For that purpose the lifting beam does not need to actively perform any movement because the rotor blade can move downwardly due to its weight. The lifting beam however permits the pivotal movement and can guide it.

When the rotor hub has assumed the second fitting position and is fixed therein the lifting beam can be released from the first rotor blade and used to receive the second rotor blade. To release the lifting beam it is firstly lowered in such a way that the weight of the rotor blade no longer loads the lifting beam but is now basically carried completely by the rotor hub. Preferably a release device is then actuated, which in particular withdraws bolts or pins from loops of the blade fixing means of the lifting beam thereby to release the connection between the lifting beam and the rotor blade. Such release can advantageously be effected without personnel having to be in attendance in that region of the rotor blade. In particular no carrier cage for corresponding people is required there.

Preferably in further steps the second rotor blade is lifted by means of the crane and the lifting beam in a substantially horizontal orientation and arranged at and fixed to the correspondingly oriented fixing portion of the rotor hub. The first rotor blade which is fitted in the 3 o'clock position was correspondingly lowered to a 5 o'clock position so that now the second rotor blade is fitted in the 9 o'clock position. The rotor hub is still locked in that position and thus, after fixing of the second rotor blade, the lifting beam can be released and removed from the second rotor blade.

It is preferably provided that, after release of the lifting beam from the first rotor blade, the rotor hub is rotated through about 180° about a vertical axis. That simplifies installation of the second rotor blade because now the second rotor blade is lifted and fitted for example at the position where the first rotor blade was also lifted and fitted. As the rotor hub projects with respect to the pylon those two positions are not completely identical but very similar. In particular the second rotor blade can be provided in the same manner on the ground for example with a transport vehicle.

Preferably, for fitting the third rotor blade, it is proposed that firstly a ballast arm is mounted to the rotor hub, namely at the third fixing region which is still free and which is intended for the third rotor blade. That third fixing region after fitment of the second rotor blade is firstly in a so-called 1 o'clock position, that is to say in a position in which it points upwardly and is only rotated through 30° from a perpendicularly upwardly pointing position. To fit a rotor blade, that is to say the third rotor blade, in that position, it would have to be lifted very high. That may require a very large crane and cause correspondingly high costs, which is to be avoided. Rotation of the rotor hub by downward movement of a rotor blade, as was effected after fitment of the first rotor blade, is not readily possible because the two rotor blades which have been installed up until now, by virtue of their weight conditions, would lead to a movement of the rotor hub in an unwanted direction. Because of the weight conditions the rotor hub would tend to move to a position at which the third fixing region would point perpendicularly upwardly. Therefore in accordance with a configuration it is now proposed that a ballast arm is fitted to the third fixing region in the 1 o'clock position. That ballast arm has a fixing flange similarly to a rotor blade, but is otherwise substantially shorter than a rotor blade, and can be of a curved or bent shape, from its fixing flange. In particular the ballast arm is of such a configuration that it can be installed with a crane height which is as low as possible. Preferably that ballast arm is or such a configuration that it can be lifted directly with the crane without using a lifting beam and possibly has a functionality or a part of the functionality of a lifting beam, insofar as for example it permits a rotary or pivotal movement.

When the ballast arm is fitted the locking of the rotor hub—which is also referred as bolting engagement—can be released. The ballast arm can then be lowered, guided by the crane, into a 3 o'clock position of that third fixing region. In that third fitting position the rotor hub is then locked again—more specifically by bolting engagement—and the ballast arm can be removed again. Finally the third rotor blade is fitted in a horizontal orientation.

Preferably in this case also the rotor hub can be rotated through 180° about a vertical axis, in particular being rotated back again, previously, namely after fitment of the second rotor blade and prior to fitment of the ballast arm or at least prior to fitment of the third rotor blade.

In addition in accordance with an embodiment it is proposed that the lifting beam rotates the respectively lifted rotor blade which is to be fitted in place about a longitudinal axis, more specifically for example about its rotor blade axis, in a region around the rotor blade axis, in such a way that the rotor blade presents the lowest possible wind resistance. The lifting beam can preferably actively perform that movement by actuation of actuator of a longitudinal pivoting means.

Preferably a lifting beam in accordance with at least one of the above-described embodiments is used and/or a handling arrangement as described hereinbefore is used.

According to the invention there is also proposed a method of fitting a rotor hub. In particular for fitting a rotor hub which as specified has three rotor blades. In accordance therewith firstly the rotor hub is fitted to the pod and then the rotor blades are successively fitted to the rotor hub. That fitment procedure is effected in accordance with a method of fitting rotor blades as described hereinbefore in accordance with at least one of the embodiments.

In addition there is proposed a method of removing rotor blades which basically corresponds in substance to the described method of fitting rotor blades in the reverse sequence. In accordance therewith firstly with the rotor hub in a locked condition a third rotor blade can be removed in a horizontal position, that is to say for example in the 3 o'clock position. A ballast arm is then fitted there, which in that case is still held by the crane while the locking of the rotor hub is released. The ballast arm is then lifted into a 1 o'clock position by means of the crane so that the second rotor blade assumes a 9 o'clock position. The rotor hub is locked in that position, the ballast arm removed and the second rotor blade dismantled. The ballast arm is then fitted in the 9 o'clock position and the rotor hub is then released again and rotated by means of the ballast arm so that the remaining rotor blade is in a 3 o'clock position. The rotor hub is then locked and the last rotor blade removed.

There is also proposed a method of replacing rotor blades. That method is effected in such a way that rotor blades are removed as described and then new or reconditioned rotor blades are fitted as described.

BRIEF DESCRIPTION OF THE SEVERAL VIEWS OF THE DRAWINGS

The invention will now be described in detail hereinafter by means of embodiments by way of example with reference to the accompanying Figures.

DETAILED DESCRIPTION

Figure 1:
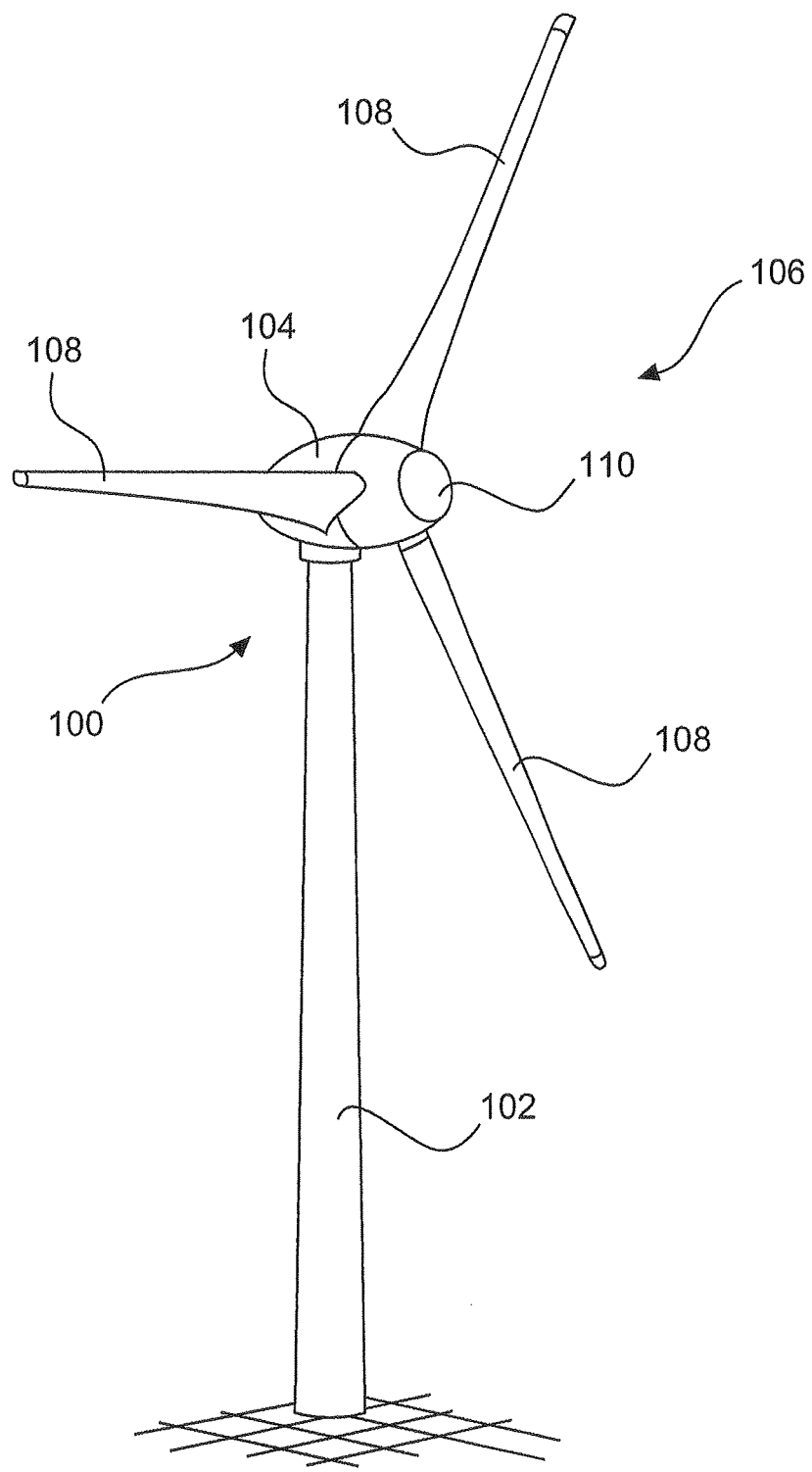
FIG. 1 shows a horizontal-axis wind power installation having three installed rotor blades.

FIG. 1 shows a wind power installation 100 comprising a pylon 102 and a pod 104. Arranged on the pod 104 is a rotor 106 with three rotor blades 108 and a spinner 110. In operation the rotor 106 is caused to rotate by the wind and thereby drives a generator in the pod 104.

Figure 2:
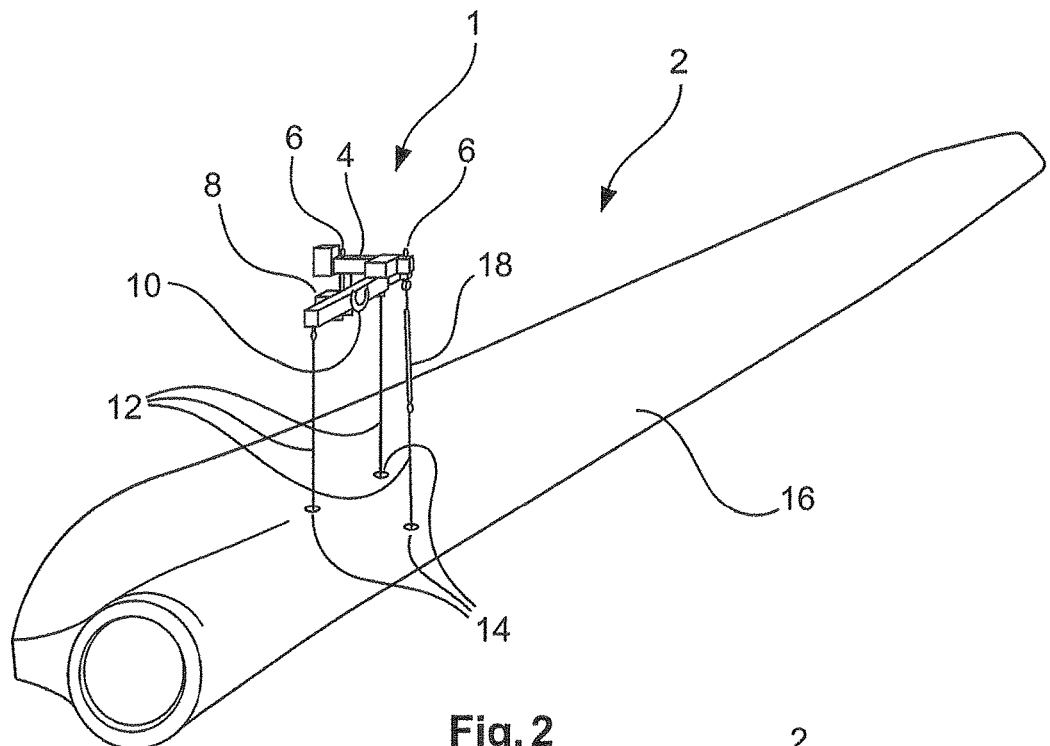
FIG. 2 shows a diagrammatic perspective view of a rotor blade lifted by a lifting beam.

FIG. 2 shows a lifting crossbeam 1 at which a rotor blade 2 is arranged and is lifted and held by the lifting beam 1. The view is a perspective one and the rotor blade 2 is disposed in a substantially horizontal orientation in relation to the rotor blade longitudinal axis. The lifting beam 1 has an upper carrier frame portion 4 for fixing to a crane. In the view shown in FIG. 2 and also FIG. 3 the lifting beam is disposed fixed to a crane which however is not shown in FIGS. 2 and 3 for the sake of simplicity. Fixing eyes 6 which can also be referred to as pick-up points are provided for fixing to the crane.

Provided beneath the upper carrier frame portion 4 and approximately transversely thereto is a lower carrier frame portion 8. The lower carrier frame portion 8 can be pivoted in relation to the upper carrier frame portion 4, more specifically about an axis extending substantially transversely to the rotor blade longitudinal axis. In that way the rotor blade longitudinal axis and therewith accordingly the rotor blade 2 can be tilted. For guiding such a tilting or pivotal movement the arrangement has a brake device 10 which can also be referred to as a securing device.

For fixing the lifting beam 1 to the rotor blade 2 there are provided three blade fixing means 12 which for the sake of simplicity are denoted by the same reference and which have elongate cables with round loops or slings. Those elongate cables are passed through openings 14 in the rotor blade surface 16 and have loops for fixing purposes, in the interior of the rotor blade 2. One of the rotor blade fixing means 12 has a hydraulic cylinder 18 as an actuator to be able to actively alter the length of the blade fixing means 12 in question. The rotor blade 2 can be pivoted about its rotor blade axis by virtue of such a change in length.

Figure 3:
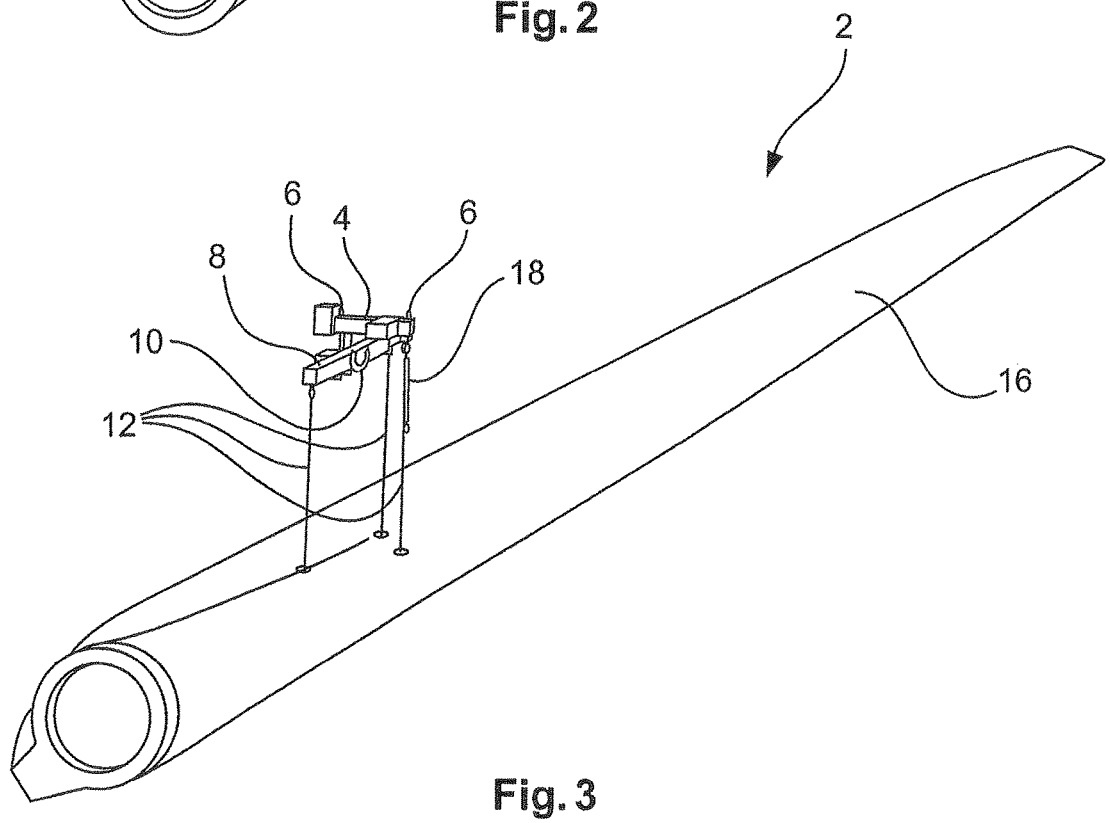
FIG. 3 shows the lifting beam with rotor blade of FIG. 2 with the rotor blade in a position rotated about its rotor axis.

FIG. 3 shows such a position of the rotor blade 2, in which it is pivoted about the rotor blade longitudinal axis. In FIG. 3 the hydraulic cylinder 18 is retracted in relation to the FIG. 2 position whereby the corresponding blade fixing means 12 has been reduced in length, whereby the pivoted or rotated position in FIG. 3 was attained.

Thus the rotor blade 2 can be lifted by means of a fitment crane and the lifting beam 2. In that case the loop of the blade fixing means 12 are connected to the rotor blade 2 by locking bolts. The rotor blade 2 is rotated about the blade axis by means of the hydraulic cylinder 18 in order to afford a surface which is as small as possible for the wind to act thereon.

Figure 4:
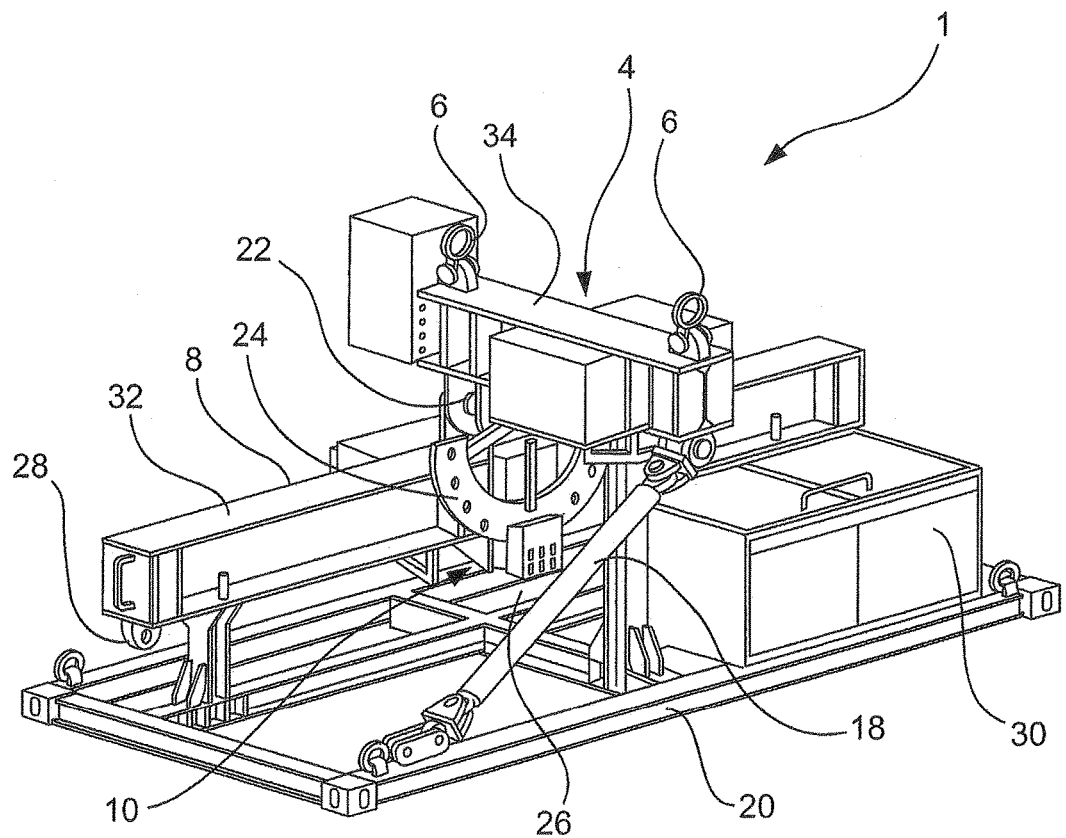
FIG. 4 shows a perspective view of a lifting beam fixed on a transport frame.

In FIG. 4 the lifting beam 1 is prepared in a condition of being ready for transport on a transport frame 20 for transport on a vehicle. FIG. 4 shows further details like the fixing eyes 6 in the form of shackles for fixing the lifting beam 1 to a crane. The lower carrier frame portion 8 is pivotable by way of a pivot joint 22 relative to the upper carrier frame portion 4. For controlling such a pivotal movement the brake device 10 has a brake disc 24 and a brake means 26, such as caliper brakes, which engages the brake disc 24 and can thereby control the pivotal movement. The lower carrier frame portion 8 has two blade fixing eyes 28 of which one can be seen and a further one is arranged behind the transport box 30. Both blade fixing eyes 28 are arranged on a longitudinal bearer 32 which substantially forms the lower carrier frame portion 8.

The third blade fixing means 12 is fixed directly to the upper carrier frame portion 4, namely directly below the transverse bearer 34 which forms a substantial component of the upper carrier frame portion 4. That blade fixing means 12 which is fixed to the transverse bearer 34 has the hydraulic cylinder 18 which here is arranged in a transport position. In operation of the lifting beam, when it has been removed from the transport frame 20 and used, the blade fixing means 12 additionally have cables with round slings. Those cables are shown in FIGS. 2 and 3 but in transportation can be transported separately on the transport frame 20 and disposed for example in the transport box 30.

Figure 5:
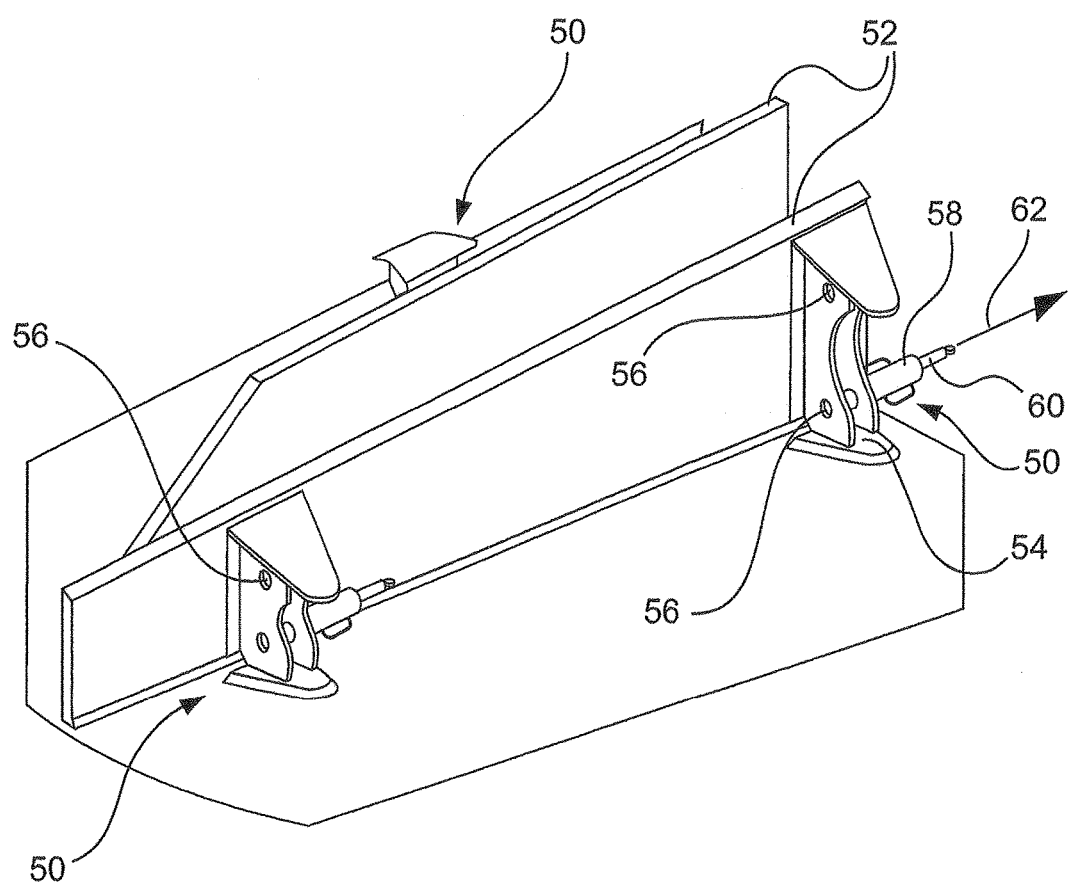
FIG. 5 shows a perspective view of a portion of an internal space in a rotor blade with fixing portions.

FIG. 5 shows three fixing portions 50 which for the sake of simplicity are denoted by the same references although there are some differences in particular in dimensions. The fixing portions 50 are fixed to inner structures of the rotor blade, such as by stiffening ribs 52. The fixing portions each include two holding walls 54 which each have two mutually aligned bores 56. A further pair of bores 56 can be provided in order for example to modify the fixing position. Such a further pair of bores of each fixing portion 50 is however not absolutely necessary.

Provided in the region of the two bores 56 is a bolt device 58 having a respective prestressed bolt or pin 60. A pulling device like a cable can be arranged at the prestressed bolt 60 to pull the bolt in the opening direction 62 to release a loop. FIG. 5 shows the opened condition. In that condition a loop can be arranged between two bores 56 and thus between two holding walls 54. For fixing purposes the prestressed bolt 60 is then pushed through the respective corresponding two bores 56 in order thereby to receive the loop arranged there.

For release purposes it is only necessary for the bolt 60 to be pulled in the opening direction 62 and a corresponding loop would then be released again.

There is thus proposed a solution which addresses problems of limited lifting capacities in particular of cranes and which affords a possible way of subsequently fitting the rotor blades after mounting of the rotor hub has been effected, or installing same thereafter. In that respect it is also proposed that a connection between the rotor blade and the lifting beam can be released automatically or semi-automatically without the direct involvement of personnel at the receiving location.

For that purpose the lifting beam is suspended from the crane hook of the fitting crane. The lifting beam is connected to the rotor blade by means of round loops or slings and the rotor blade is lifted by means of the lifting beam. In that case guide cables can be fixed to the lifting beam. After fitment of the rotor blade corresponding locking pins or bolts at the pick-up points are released, in particular by way of remote actuation. The lifting beam is then further lifted so that the round loops are pulled out of the rotor blade. The proposed solution also affords the option of lowering or lifting the rotor blade through a given angle by means of the lifting beam. After the rotor blade is lowered the rotatably or pivotably mounted carrier of the lifting beam is held in its position by a brake device. Thereafter the pick-up points are unlocked and the beam is released from the rotor blade.

A reduction in the item weights for the fitting crane can be achieved by the proposed solution, as advantages. In addition mounting of the wind power installation can be achieved at higher wind speeds than when other solutions are adopted. Furthermore it is possible to avoid the use of crane baskets and when lifting the rotor blades the orientation thereof can be manipulated, in which case at the same time only one crane hook is necessary.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A lifting beam for lifting a rotor blade of a wind power installation, the lifting beam comprising:
   a crane fixing means for fixing the lifting beam to a crane;
   three blade fixing means for fixing the lifting beam to the rotor blade, each blade fixing means having a respective carrier loop for releasable fixing to the rotor blade;
   a longitudinal pivoting means for pivoting the rotor blade carried by the lifting beam about a longitudinal axis of the rotor blade, wherein the longitudinal pivoting means has a linear actuator that includes a hydraulic cylinder for raising and lowering at least a portion of the blade fixing means, wherein the linear actuator is arranged between one of the carrier loops of one of the blade fixing means and the lower carrier frame portion; and
   a transverse pivoting means for pivoting the rotor blade carried by the lifting beam about a transverse axis that is transverse relative to the longitudinal axis.

2. The lifting beam according to claim 1 wherein:
   the transverse pivoting means is adapted for passive pivoting and has a brake means and a securing means for securing the lifting beam in at least two mutually different pivotal positions.

3. The lifting beam according to claim 1 further comprising:
   an upper carrier frame portion configured to be connected to the crane; and
   a lower carrier frame portion to be connected to the rotor blade, wherein the transverse pivoting means is adapted to perform a pivotal movement of the lower carrier frame portion relative to the upper carrier frame portion.

4. The lifting beam according to claim 1 wherein the crane fixing means has at least one suspension portion that includes at least one of a ring, an eye or a shackle for suspending the lifting beam from the crane.

5. A handling arrangement for handling a rotor blade of a wind power installation, the handling arrangement comprising:
   a lifting beam according to claim 1; and
   a release device for releasing the fixing between the rotor blade and the lifting beam.

6. The handling arrangement according to claim 5 wherein the rotor blade has an aerodynamic blade surface and an internal space, wherein the blade surface has three openings, each for passing therethrough a respective one of three blade fixing means of the lifting beam, and wherein the internal space is provided with fixing portions for fixing the three blade fixing means of the lifting beam.

7. The handling arrangement according to claim 5 wherein the carrier loops are configured to connect with bolts coupled to the rotor blade, wherein the release device has a pull means for pulling the bolts out of the carrier loops to release connections therebetween.

* * * * *